United States Patent Office 3,182,110
Patented May 4, 1965

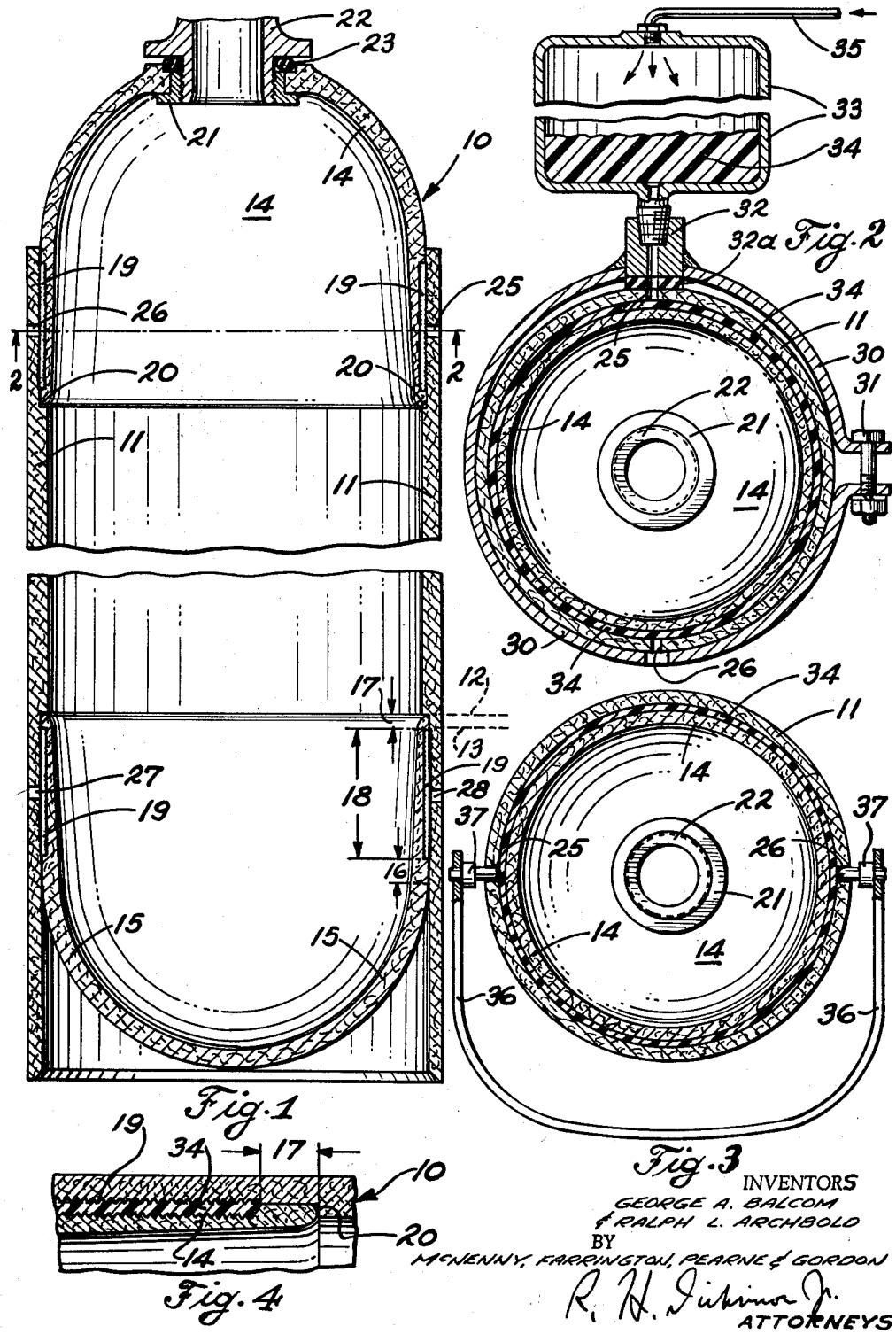

3,182,110
METHOD AND APPARATUS FOR MAKING FIBER GLASS TANK
George A. Balcom, Cleveland, and Ralph L. Archbold, Euclid, Ohio, assignors to White Consolidated Industries, Inc., a corporation of Delaware
Original application Nov. 5, 1958, Ser. No. 772,026, now Patent No. 3,095,993, dated July 2, 1963. Divided and this application July 2, 1962, Ser. No. 207,118
2 Claims. (Cl. 264—263)

Reference is made to our co-pending application, Serial No. 772,026, filed November 5, 1958, now Patent No. 3,095,993, issued July 2, 1963, of which the instant application is a division.

Our invention relates to fiber glass tanks and more particularly to a tank made of sections having cylindrical portions and the method by which said cylindrical portions are secured to each other.

The weight and non-corrosive advantages of tanks made of fiber glass have been recognized and numerous attempts have been made to construct such tanks of separately manufactured sections and cementing or otherwise securing such sections to each other.

The present invention relates to the making of a fiber glass tank particularly suited for domestic water softeners or the like wherein the tubular body of the tank and the end caps for the tank include cylindrical portions which are shaped to facilitate the assembly of the body and end caps. The invention also provides end cap and body construction suited for use with novel apparatus for effecting the firm attachment of the tank parts to each other.

It is among the objects of our invention to provide a method and apparatus for making a fiber glass tank having a tubular body wherein each end of the tubular body is undercut at its inner diameter and wherein the end caps for the tank are formed to telescope within said undercut portions of the body and wherein the end caps and undercut body portion are shaped to provide an annular locking ring securely fixing the end caps to the body.

It is a further object of our invention to provide an apparatus for forming the annular locking ring of the preceding object.

It is a further object of our invention to provide a method of forming telescopic portions of a tank body and end caps to provide an annular chamber which is filled with a bonding material and wherein the bonding material is cured under pressure and is fixed to portions of the tank body and portions of the end caps so as to provide a structure which will withstand high fluid pressures.

Further objects and advantages relating to reduction in cost of tank manufacture, long life and ruggedness in construction will appear from the following description and the appended drawings wherein:

FIG. 1 is a sectional elevation of a tank having a body and end caps assembled according to our invention;

FIG. 2 is a sectional view of the tank taken along the plane as indicated at 2—2 of FIG. 1 and wherein the tank is fitted with means for introducing the bonding material;

FIG. 3 is a transverse sectional view similar to the view of FIG. 2 and wherein the tank is fitted with means for retaining the bonding material under pressure during the curing of the tank; and FIG. 4 is an enlarged sectional view of the joint between the tank body and an end cap with the bonding material cured in position.

The tank assembly indicated in its entirety in FIG. 1 as at 10 includes a tubular section 11. This tubular section is preferably made from resin impregnated fiber glass wherein the fiber glass is characterized by chopped fibers about two inches long compressed to form a dense mat. The spaces between the mat fibers are filled with resin and the tube 11 in its cured form is fluid-tight, well suited to withstand domestic water system pressures. Numerous methods of forming tubular fiber glass articles may be employed and preferably the tube is made according to the method and apparatus disclosed in U.S. Patent No. 3,012,922 to Arthur J. Wiltshire of December 12, 1961, owned by the assignee of the instant application. After the tubular section 11 is completed it is formed to provide a wall thickness of about three-tenths of an inch for a tank about seven inches in diameter. The end portions of the tube are then undercut. It will be understood that in the drawings the showing of the wall thickness is not to scale but for clarity illustration of the thickness of the parts and the changes in dimensions by machining have been exaggerated.

The undercut for each end of the tubular structure 11 is preferably about .020 inch. The undercut from the bottom of the tank, as shown in FIG. 1, extends from the extreme end of the tank to the plane indicated at 12. The undercutting may be accomplished in a lathe and the undercutting tool is followed by a grooving cutter which grooves the undercut portion of the tube to the plane indicated at 13. The grooves may be parallel or spiral and are about .005 inch deep. The groove dimension is exaggerated in the drawings.

The tank is provided with a top end cap 14 and a bottom end cap 15. The end caps are made in matched metal molds and are preferably proportioned to provide a thickness of about one-eighth of an inch for a seven inch diameter tank. Each of end caps 14 and 15 is formed to provide cylindrical portions which are telescoped within the undercut section of the tubular body 11. The cylindrical portions of each of the end caps are machined to have a diameter in the portions indicated at 16 and 17 about .010 inch greater than the internal diameter of the undercut portion. This provides a tight "interference fit" in areas 16 and 17. The exterior of each of the end caps is then provided with an annular channel having an axial extent as indicated at 18 in FIG. 1. The annular channel or groove is indicated at 19. The bottom of the annular groove 19 is preferably provided with grooves about .005 inch deep. The extreme end portions of the caps 14 and 15 are each chamfered as indicated at 20 to facilitate the telescoping of the end caps within the tubular body 11. The end cap 14 prior to being fitted within the tube 11 is provided with a metal outlet fitting 21 which is cemented into the end cap 14. As illustrated in FIG. 1, the interior threads of the fitting 21 are adapted to receive threads on a valve body 22 and an O-ring 23 may be pressed between the end face of the end cap 14 and the flange of the valve body.

After the end caps 14 and 15 and the tubular body 11 are machined they are assembled as illustrated in FIG. 1. Openings are provided at each end of the tank body as indicated at 25, 26, 27 and 28 and each end of the tank is then fitted with a clamping member 30 which is in the form of a metal band with the free ends of the band bolted to each other as at 31. A filler plug 32 is welded to the band 30 and is aligned through gasket 32a with hole 25 in the wall of the tubular member 11.

A container 33 is filled with a bonding mixture indicated at 34 which consists of two parts of powdered asbestos and one part of a polyester resin, preferably a resin known as Hetron No. 31, and a catalyst which is about one percent by weight of methyl ethyl ketone peroxide. The catalyst is also known in the trade as MEK. The container 33 is fitted with an air inlet line 35 and air under pressure is applied to the surface of the bonding mixture 34 so as to force this mixture down into the annular chamber 19. The pressure is continually applied to the mixture 34 until the bonding mixture appears at the outlet opening 26. The bonding mixture is viscous by reason of the powdered asbestos therein and tends to hold a pressure within the annular chamber 19 for a period of time after air pressure is interrupted. The pressure thus applied to the bonding mixture is sufficient to slightly enlarge the chamber 19.

Immediately after the annular chamber 19 is completely filled, the clamps 30 and the filling apparatus is removed from the tank and each end of the tank is fitted with a spring clamp 36 having plugs 37 adapted to enter the openings 25 and 26 in the wall of the tubular section 11. This is accomplished before the viscous bonding material 34 loses the pressure applied thereto during the filling of the annular chamber 19. Thus as the clamp 36 is applied, the pressure on the bonding material 34 is retained. With each end of the tank equipped with a spring clamp 36 and the bonding material being retained under pressure thereby, the assembly is placed in an oven and cured so that the bonding material polymerizes while under pressure. Expansion of the chamber 19 during the application of pressure to the bonding mixture and the expansion of the bonding mixture at the start of the curing operation presses the walls of the chamber 19 outwardly. The resilience of the walls of the chamber 19 results in a chamber that gets smaller as permitted by the shrinkage of the bonding material upon polymerization. Thus the parts of the cap and the tubular body resume their original unstressed condition after the curing of the bonding mixture and the shrinkage thereof.

As the chamber 19 is restored to its original dimensions, the walls thereof maintain firm contact with the bonding material. The interlocking grooves in the annular chamber are filled with bonding material and the bonding material forms a solid locking ring of annular shape which effectively prevents separation of the end caps from the tubular portion of the tank under pressure.

The end caps 14 and 15 in the tank 10 as illustrated are convex. Those skilled in the art will appreciate that one or both caps may be made concave depending upon the particular use for which the tank is designed. It will also be understood that the method and apparatus employed herein for bonding end caps to a tank may be utilized for securing other tubular structures, such as fiber glass pipe sections, to each other.

The term "bonding mixture" or "bonding material" as used herein includes resins and catalysts other than the polyester resin and the MEK peroxide catalyst specifically described herein. We contemplate that resins such as epoxy resins and phenolic resins may be employed as bonding materials.

Although we have described a tank according to our invention in considerable detail, numerous modifications may be made therein and in the methods and apparatus disclosed without departing from the scope of our invention as defined in the following claims:

What is claimed is:

1. Apparatus for making fiber glass tanks having a cylindrical body and end caps with cylindrical portions telescoped within said cylindrical body to provide telescoped bonding areas, said telescoped areas having adjacent surfaces provided with grooves, said cylindrical body having diametrically opposed openings into said telescoped areas, a clamp adapted to embrace said body in said telescoped areas, said clamp having diametrically opposed openings aligned with the diametrically opposed openings in said body, a supply of plastic bonding material connected to said clamp to conduct bonding material through an opening in the clamp aligned with an opening in the body, means to force said bonding material into the telescoped areas having grooves to fill said areas and discharge excess bonding material through the opposed openings in the body and clamp, and resilient means to close said diametrically opposed openings in the body and hold the bonding material therein under pressure in said grooves while the bonding material is being cured.

2. A method of securing together a tubular fiber glass body and a fiber glass end cap therefor comprising the steps of: forming in said body an annular undercut extending from one end of said body at the interior thereof and having depressions in its surface; forming in said body a pair of diametrically opposed openings communicating with said undercut; forming said end cap with an annular flange having a pair of axially spaced annular portions shaped and dimensioned to have a sealing interference fit in said undercut and having between said pair of annular portions an external axially and circumferentially continuous annular recess with depressions in its surface; positioning said flange on the end cap in said undercut in said body to provide an annular space between the body and the end cap at said annular recess in the end cap and an interference fit between said end cap and the body at opposite axial ends of said annular space; applying injection apparatus to one of said openings; forcing viscous plastic resin bonding material into said annular space through said one opening under sufficient pressure to cause resilient expansion of the walls of said annular space until said bonding material flows out of the other of said openings; removing said injecting apparatus; and immediately thereafter blocking both of said openings to prevent the loss of residual pressure in the bonding material and curing said bonding material while under pressure and enclosed within said annular space.

References Cited by the Examiner
UNITED STATES PATENTS

| 333,011 | 11/85 | Hoeveler | 18—59 |
| 868,349 | 10/07 | Lomax | 18—59 |
| 1,462,077 | 7/23 | Weston | 18—59 |
| 1,494,523 | 5/24 | Zwicker | 18—59 |
| 1,946,619 | 2/34 | Furman et al. | 18—59 |
| 2,313,074 | 3/43 | Jewell | 18—59 |
| 2,785,910 | 3/57 | Munger | 285—22 |

ROBERT F. WHITE, *Primary Examiner.*

MORRIS LIEBMAN, *Examiner.*